April 3, 1956
R. E. J. LECAVELIER
2,740,509
MULTI-RATIO MECHANICAL DRIVE, PARTICULARLY
FOR AUTOMOTIVE TRANSMISSIONS
Filed Dec. 2, 1954
13 Sheets-Sheet 1
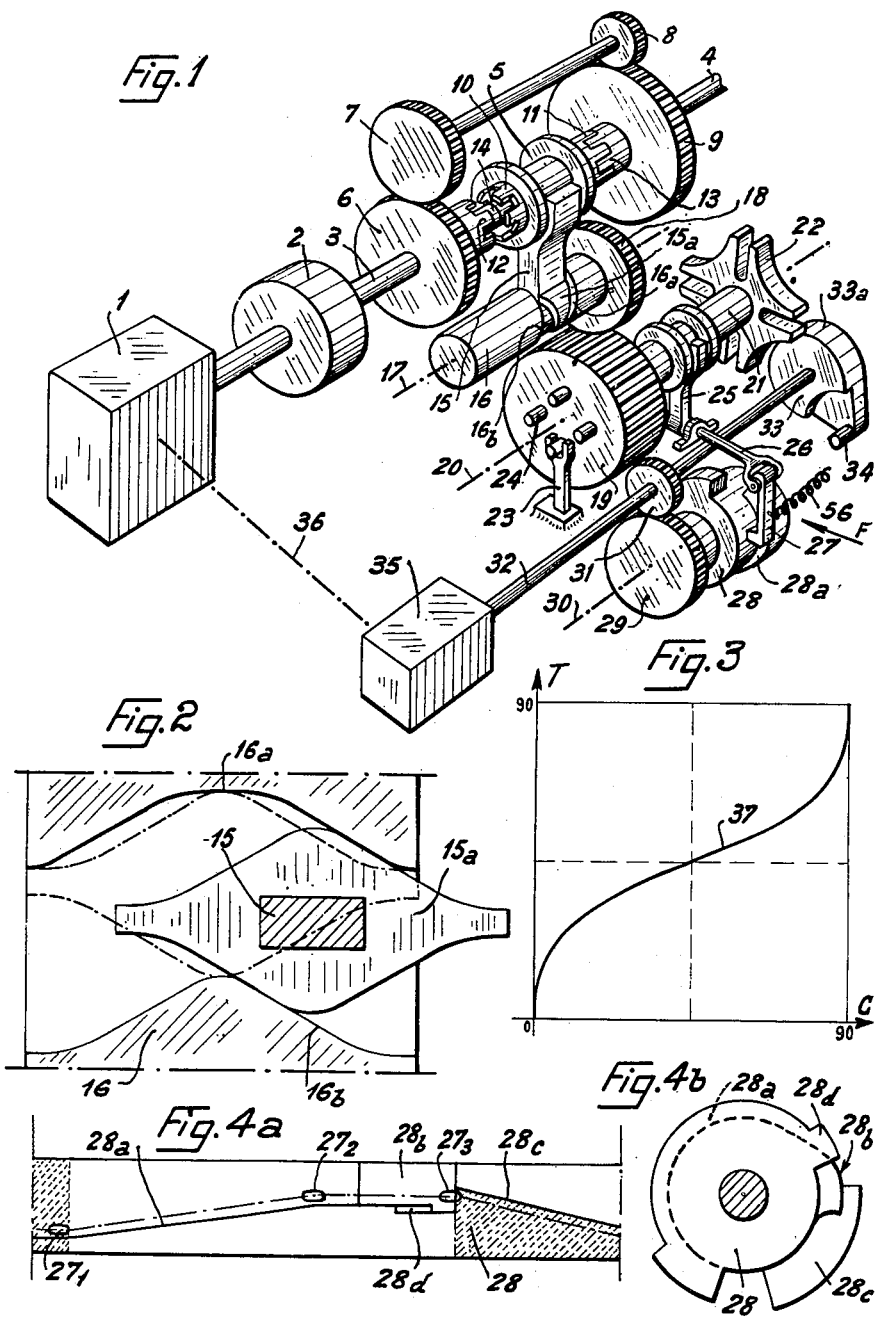
Inventor:
Robert E. J. Lecavelier
by Robert Henderson
attorney

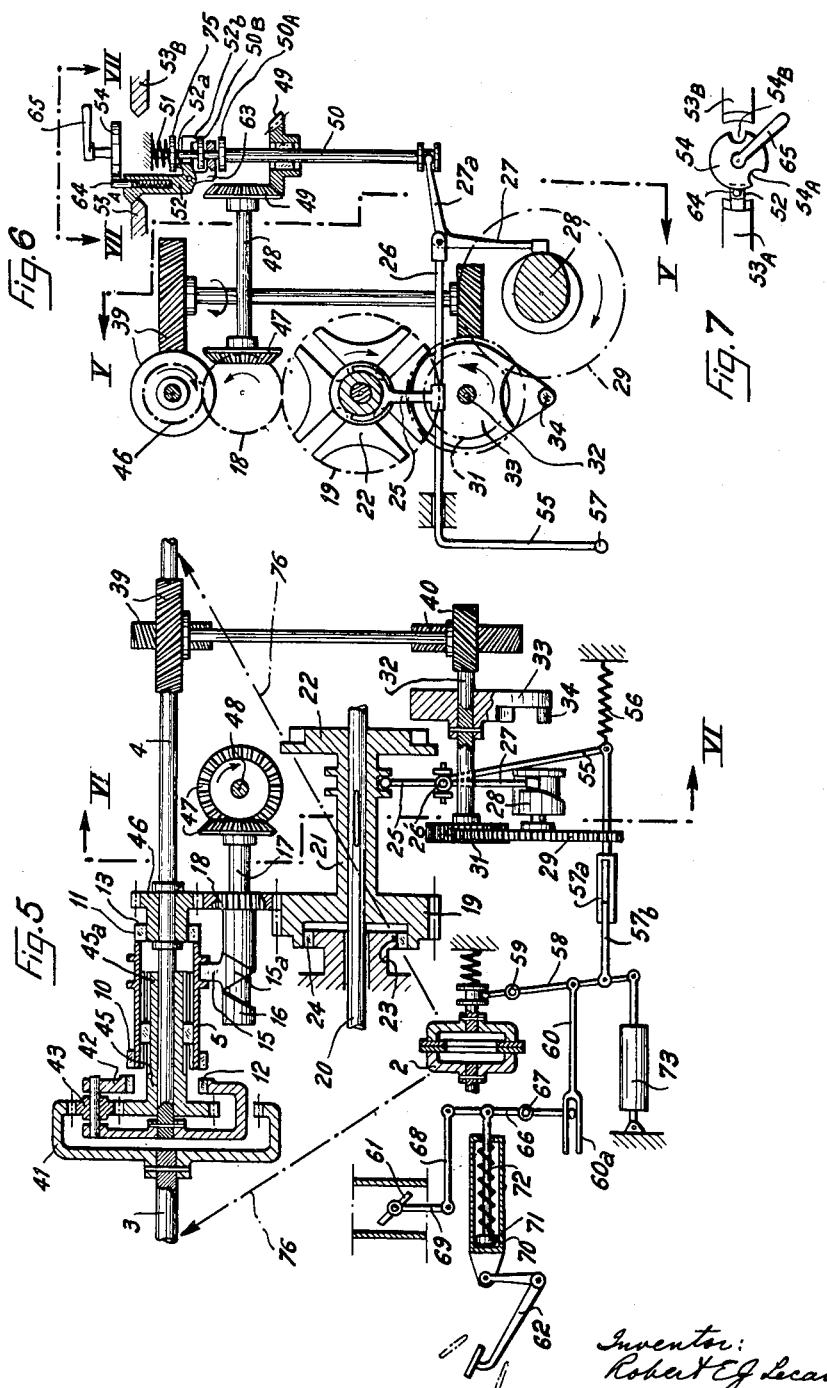

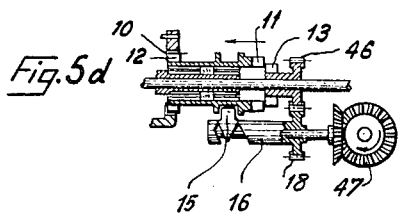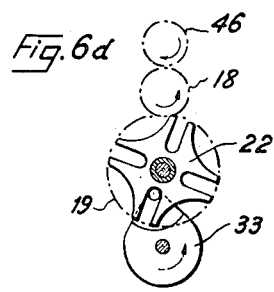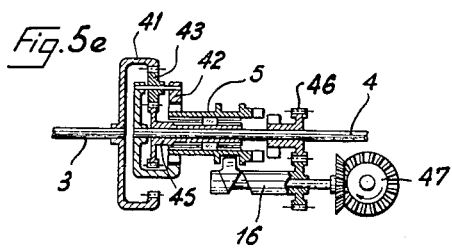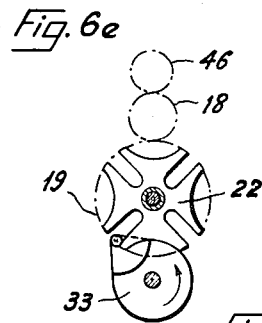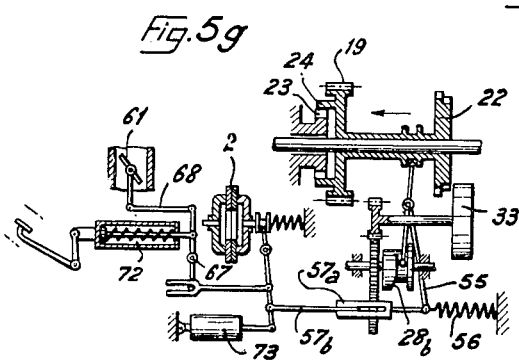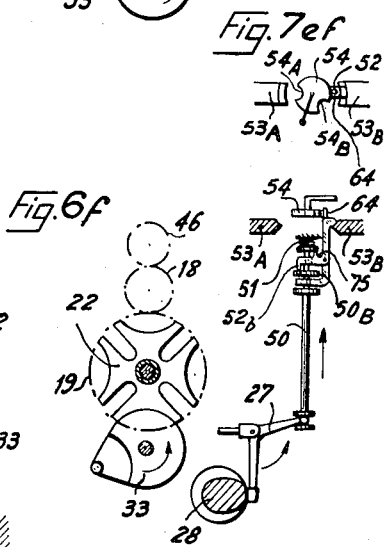

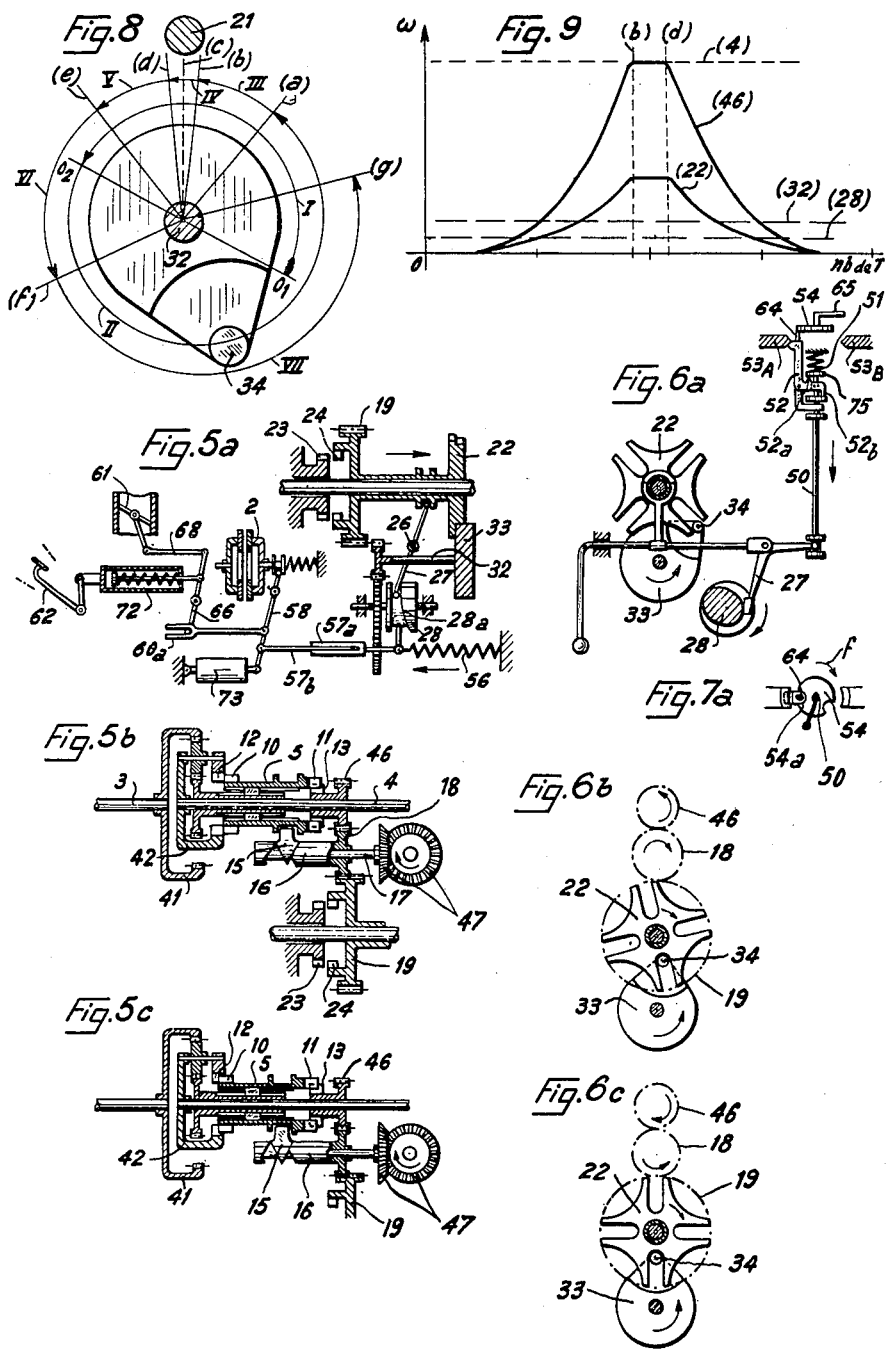

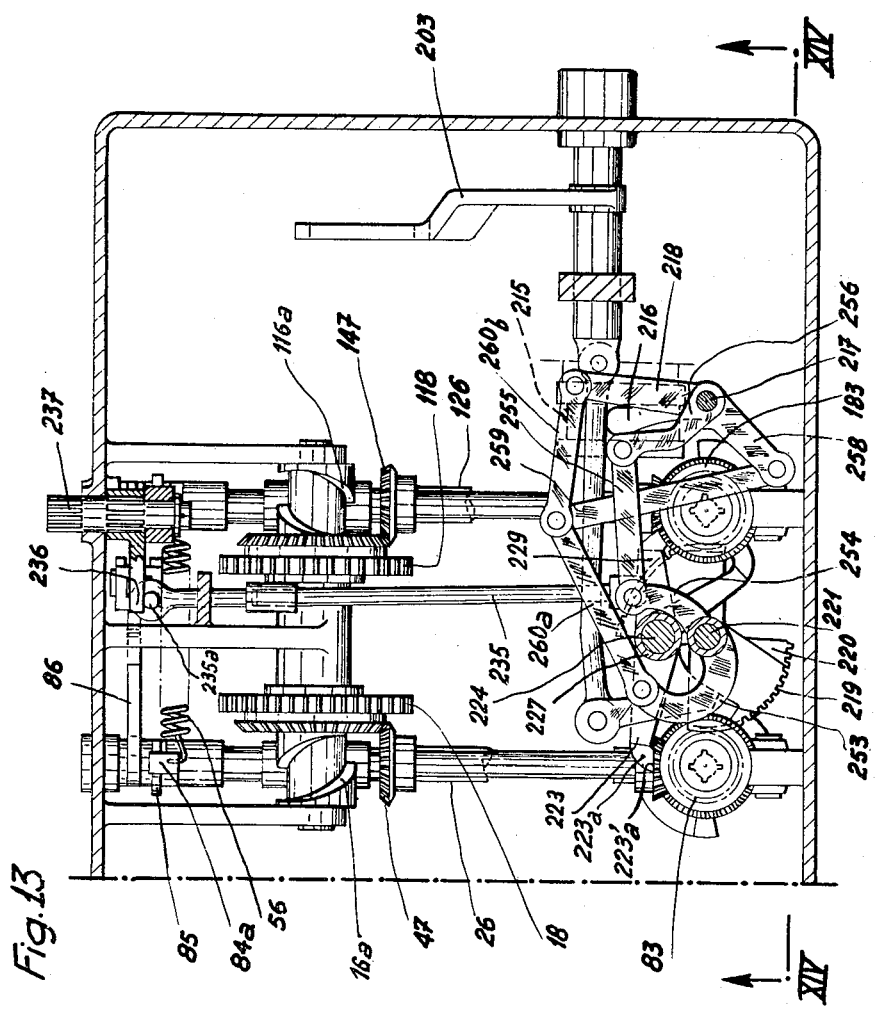

April 3, 1956
R. E. J. LECAVELIER
2,740,509
MULTI-RATIO MECHANICAL DRIVE, PARTICULARLY
FOR AUTOMOTIVE TRANSMISSIONS
Filed Dec. 2, 1954
13 Sheets-Sheet 8
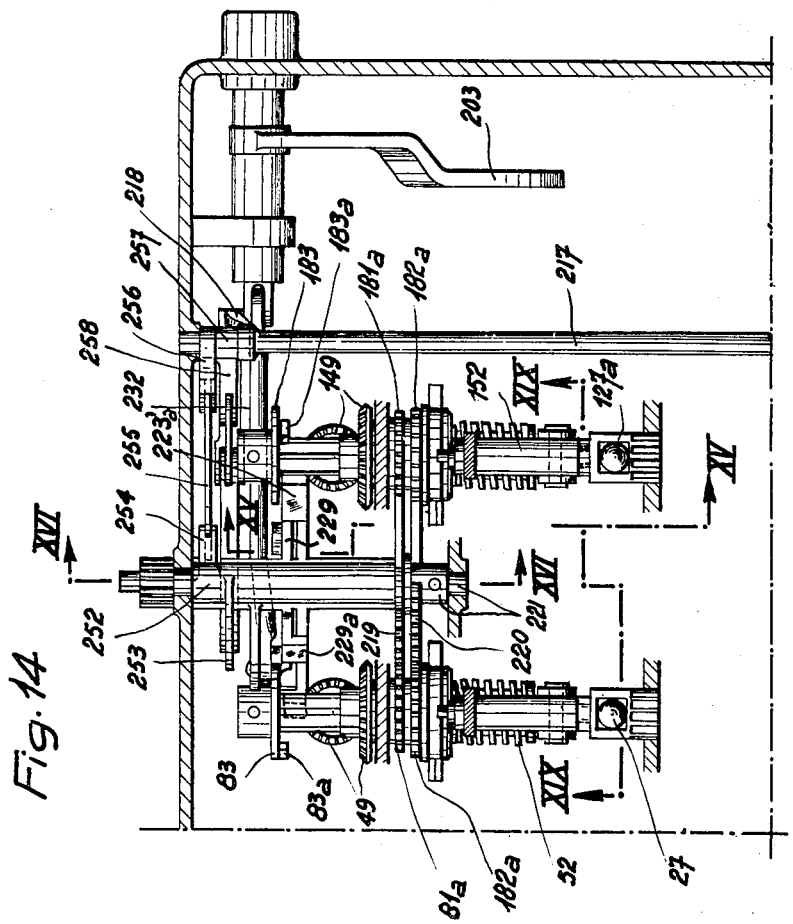
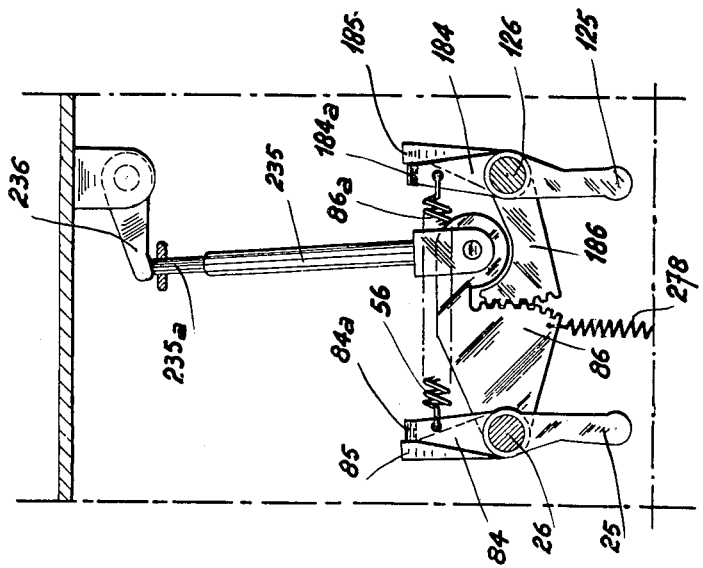
Inventor:
Robert E. J. Lecavelier
by Robert Henderson
attorney

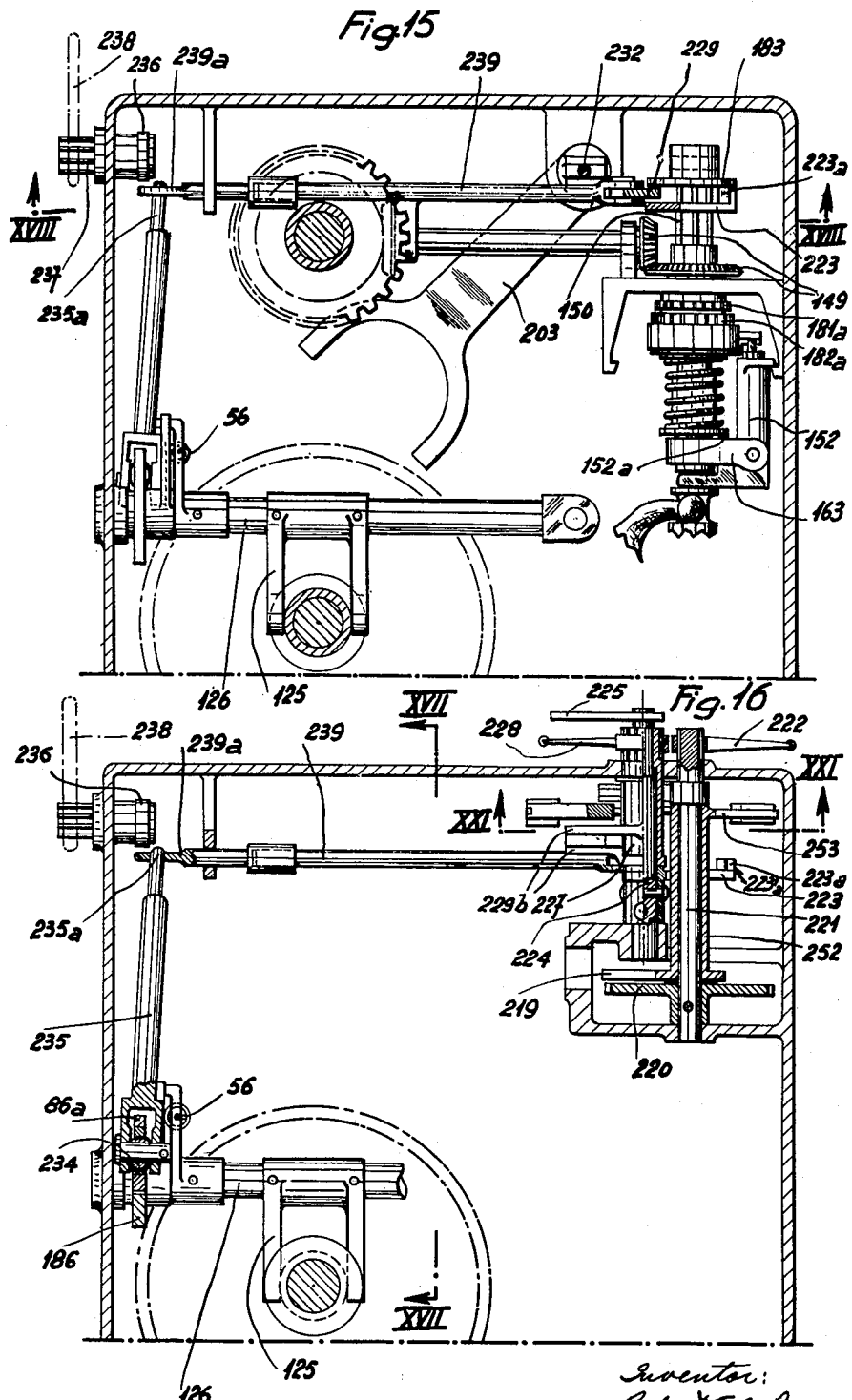

April 3, 1956 R. E. J. LECAVELIER 2,740,509
MULTI-RATIO MECHANICAL DRIVE, PARTICULARLY
FOR AUTOMOTIVE TRANSMISSIONS
Filed Dec. 2, 1954 13 Sheets-Sheet 10
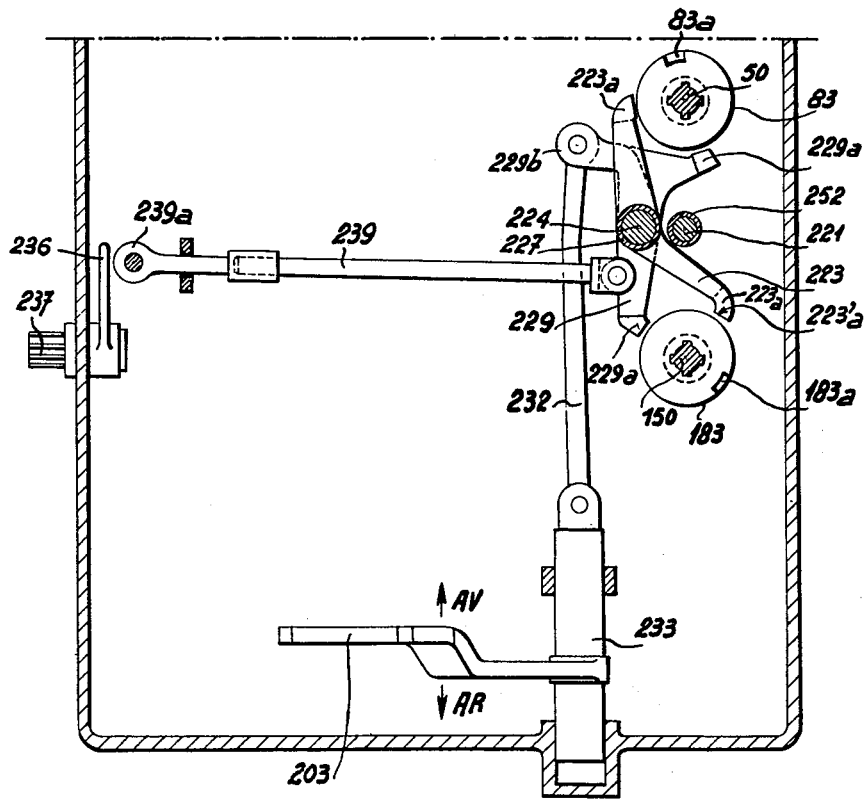
Fig. 18
Fig. 21
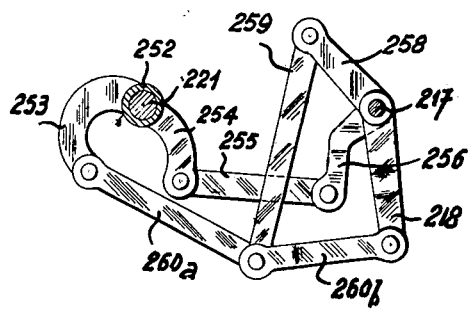
Inventor:
Robert E J Lecavelier
by Robert Henderson
Attorney April 3, 1956   R. E. J. LECAVELIER   2,740,509
MULTI-RATIO MECHANICAL DRIVE, PARTICULARLY
FOR AUTOMOTIVE TRANSMISSIONS
Filed Dec. 2, 1954   13 Sheets-Sheet 11
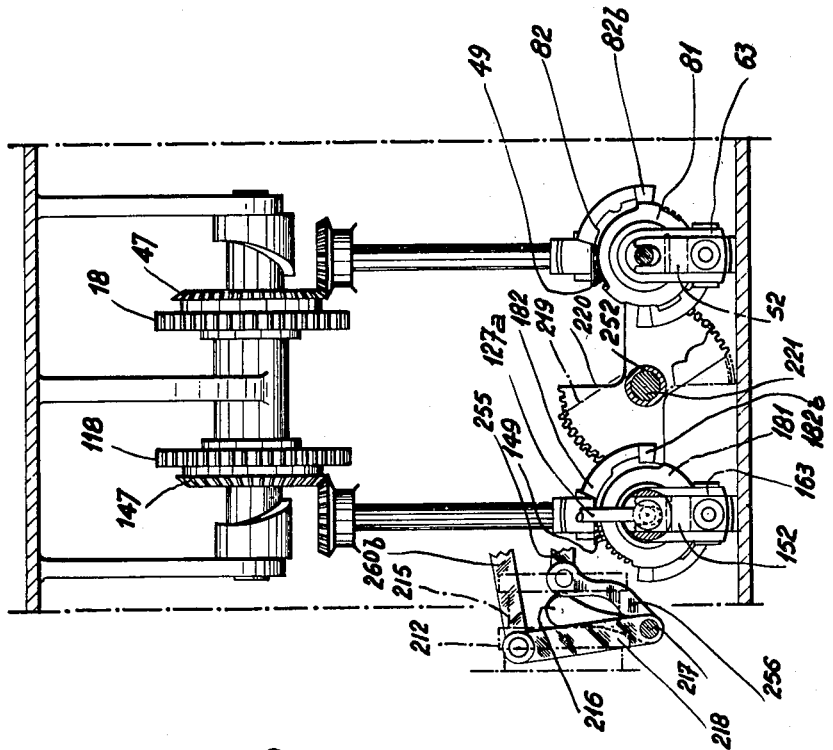
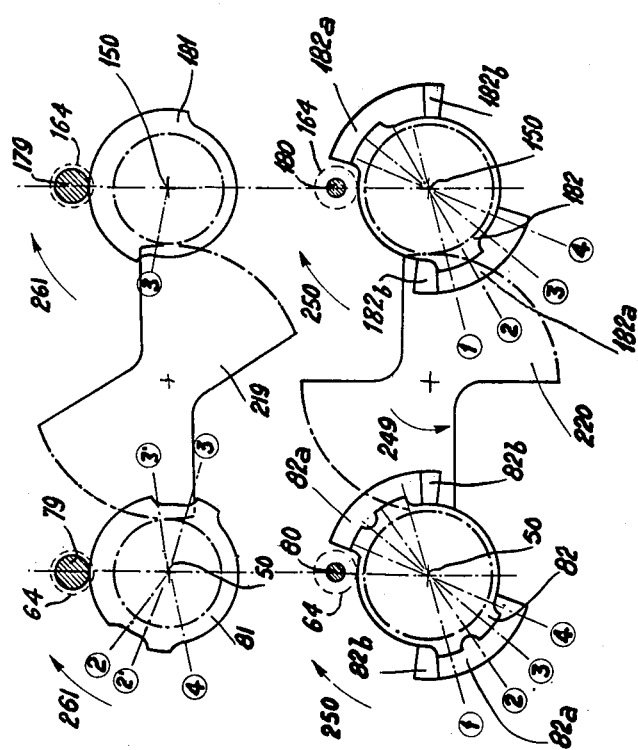
Inventor:
Robert E J Lecavelier
by Robert Henderson
attorney April 3, 1956
R. E. J. LECAVELIER
2,740,509
MULTI-RATIO MECHANICAL DRIVE, PARTICULARLY
FOR AUTOMOTIVE TRANSMISSIONS
Filed Dec. 2, 1954
13 Sheets-Sheet 12
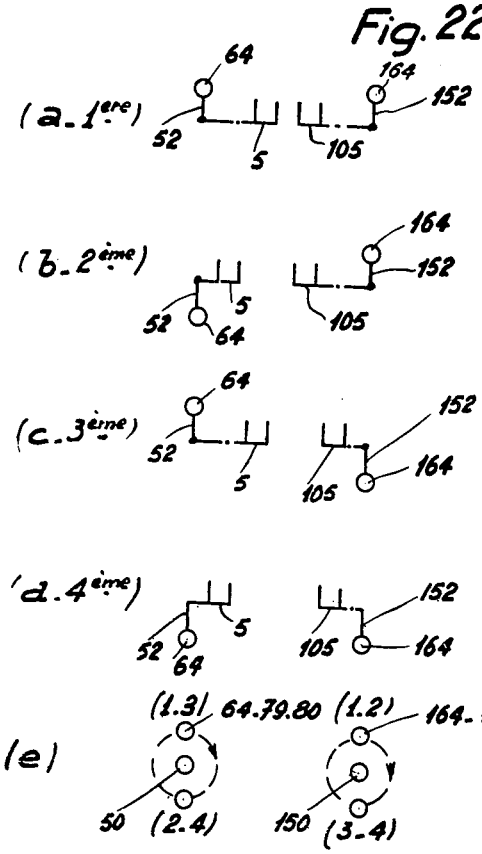
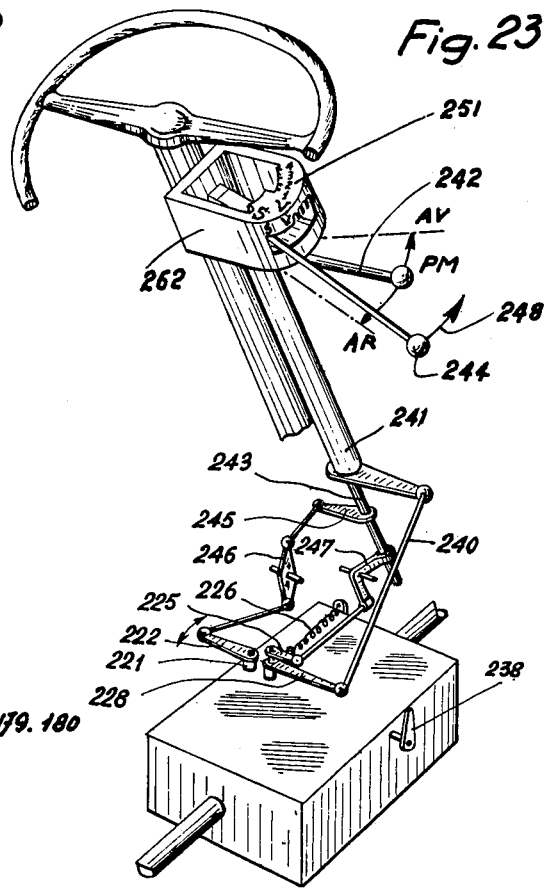
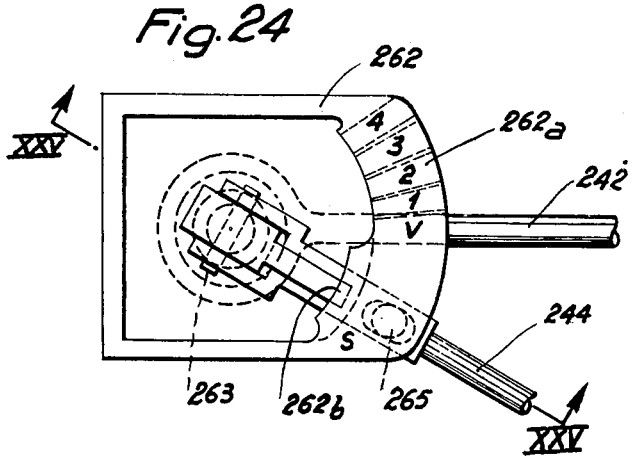

April 3, 1956    R. E. J. LECAVELIER    2,740,509
MULTI-RATIO MECHANICAL DRIVE, PARTICULARLY
FOR AUTOMOTIVE TRANSMISSIONS
Filed Dec. 2, 1954      13 Sheets-Sheet 13
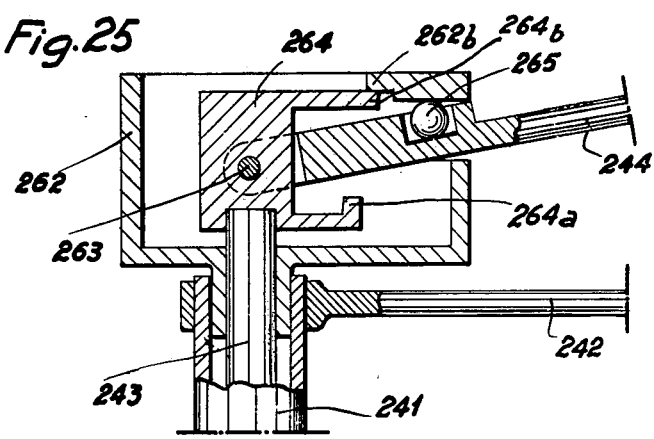

United States Patent Office 2,740,509
Patented Apr. 3, 1956

2,740,509

MULTI-RATIO MECHANICAL DRIVE, PARTICULARLY FOR AUTOMOTIVE TRANSMISSIONS

Robert E. J. Lecavelier, Paris, France

Application December 2, 1954, Serial No. 472,749

20 Claims. (Cl. 192—.092)

This invention relates to multi-ratio mechanical drives and, more particularly, to improved means therein for effecting changes between the drive ratios at which the device is operable.

An important object of the invention is the provision of such a drive mechanism wherein synchronized meshing of gears is accomplished in changes between the several drive ratios at which the mechanism is designed to function.

Another important object is the provision of such a drive mechanism wherein, once a gear shift change is initiated, such synchronized meshing of gears is accomplished automatically.

Another important object is the provision of such a drive mechanism including governing means, responsive to variations in the speed of a vehicle in which the mechanism is employed, for controlling the shifting between several drive ratios at which the mechanism is designed to function.

The foregoing and other more or less obvious objects are achieved by my invention as herein disclosed and explained.

The ensuing description made with reference to the accompanying drawings, given by way of illustration but not of limitation, will provide a clear understanding of the manner in which my invention may be put into practice, it being understood that any features of novelty resulting from the drawings or the disclosure form part of the invention.

Fig. 1 is a diagrammatic isometric view of a two-speed transmission in accordance with my invention.

Fig. 2 is a developed showing of the rotary element controlling the sliding gear.

Fig. 3 is a graph showing the angular displacements of a Geneva cross member and its driver respectively.

Fig. 4a is a schematic developed view of a control cam and Fig. 4b is a side view of the cam.

Fig. 5 is a diagrammatic view of a gearbox involving a single planetary gear train constructed according to the invention, taken along line V—V of Fig. 6.

Fig. 6 is a view on line VI—VI of Fig. 5.

Fig. 7 is a view on line VII—VII of Fig. 6.

Figs. 5a to 5e and 5g correspond to a part of Fig. 5 in various operating stages during a gear shifting operation.

Figs. 6a to 6f similarly correspond to a part of Fig. 6 and illustrate the positions of some of the elements of that figure in the same operating stages as those designated by similar subscripts in the Figure 5.

Figs. 7a and 7ef schematically indicate the elements visible in Fig. 7 at their end positions.

Fig. 8 is a diagram of the angular movements of the Geneva cross driver during a gear-shifting operation.

Fig. 9 is a diagram showing the angular displacements of some of the rotary elements of the transmission.

Figure 10:
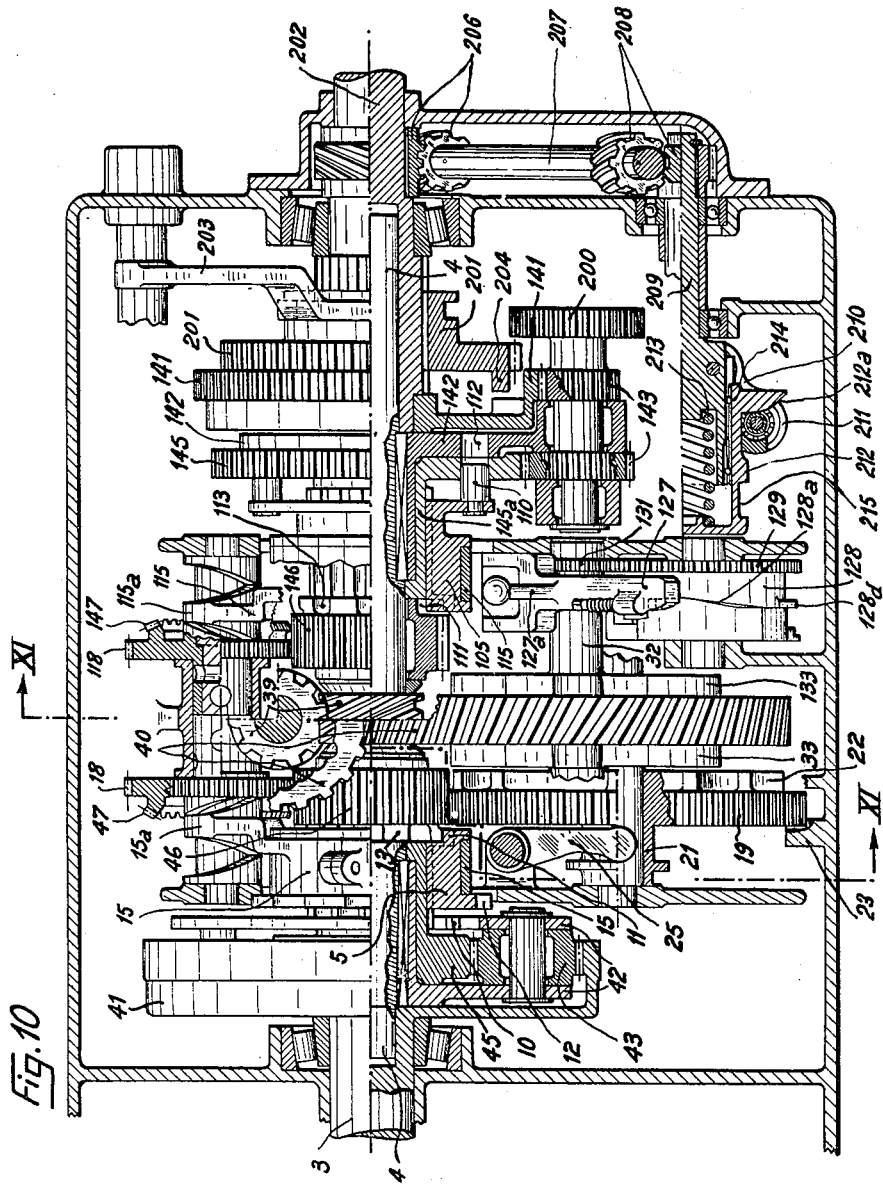

Fig. 10 is a view partly in section and part in elevation of a four-speed gearbox with four forward and one reverse speeds constructed in accordance with the invention.

Figure 11:
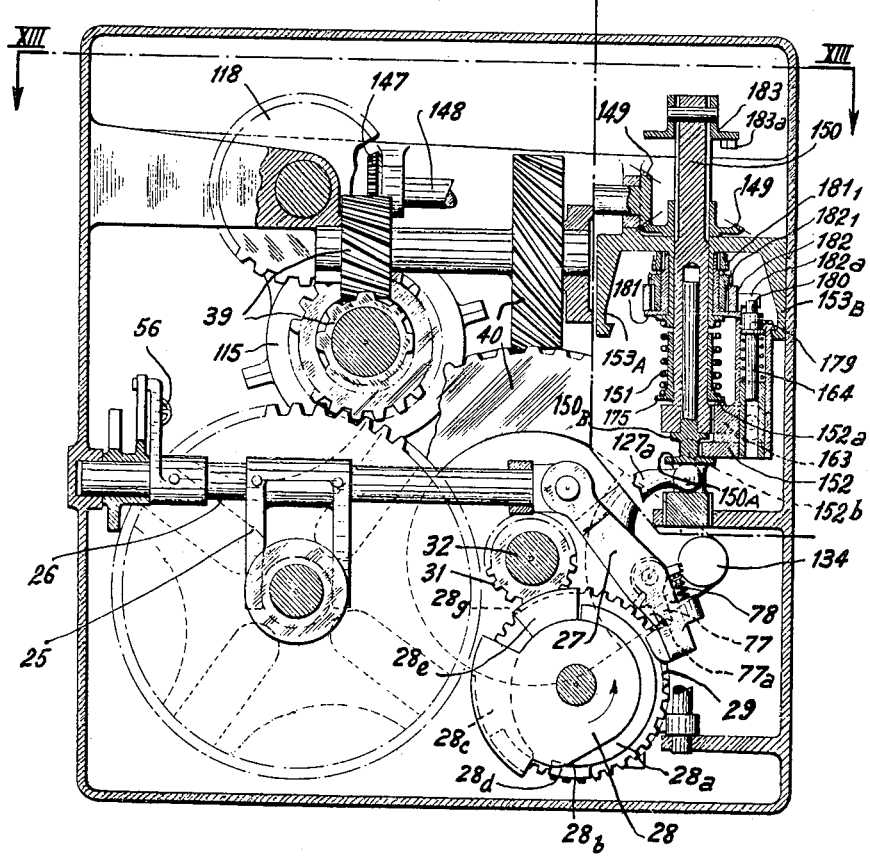

Fig. 11 is a diagrammatic sectional view, with parts broken away, substantially corresponding to line XI—XI of Fig. 10.

Figure 12:
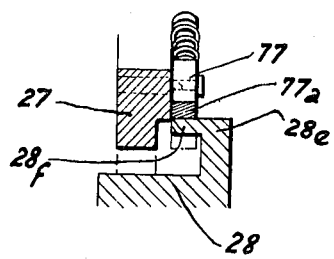

Fig. 12 is a diagrammatic sectional view showing a detail of the cam and finger arrangement.

Fig. 13 is a view on line XIII—XIII of Fig. 11, showing the general controls of the gearbox.

Fig. 14 is a view on line XIV—XIV of Fig. 13 showing part of the control assembly.

Fig. 15 is a section on line XV—XV of Fig. 14.

Fig. 16 is a section on line XVI—XVI of Fig. 14.

Fig. 17 is a section on line XVII—XVII of Fig. 16.

Fig. 18 is a section on line XVIII—XVIII of Fig. 15.

Fig. 19 is a section on line XIX—XIX of Fig. 14.

Fig. 20 is a diagrammatic view in plan of the selectors used for manual and for automatic control of the gearbox illustrated in the preceding figures. While the selectors are actually disposed in stacked pairs, they have been shown juxtaposed side by side for the sake of clarity.

Fig. 21 is a section on line XXI—XXI of Fig. 16.

Fig. 22 illustrates four diagrams for the four possible positions of the elements of the gearbox, indicated at $a$, $b$, $c$ and $d$, while Fig. 22a summarizes the indications of the four diagrams.

Fig. 23 is a simplified isometric view of a driver's station on a vehicle equipped with a gearbox according to the invention.

Fig. 24 is a detail view in plan, on an enlarged scale, of one of the controls at the station shown in Fig. 23.

Fig. 25 is a section of line XXV—XXV of Fig. 24.

In the diagrammatic illustration of Fig. 1, a motor 1 through a conventional clutch 2 drives a drive shaft 3 adapted to be coupled with a driven shaft 4 through a dog-clutch 5 slidably keyed on the driven shaft, a direct drive being obtained from the drive to the driven shaft when the sliding gear or shifting member 5 is shifted leftward, and a reduced drive through the reducer gearings 6—7 and 8—9 when the sliding-gear 5 is shifted to the right. For this purpose the gear 6 is keyed on shaft 3 whereas gear 9 is freely rotatable on shaft 4.

The sliding gear or clutch 5 at each of its ends is provided with dog clutch teeth 10 and 11 which respectively cooperate with clutch teeth 12 and 13, and moreover with auxiliary conical clutch surfaces 14 of conventional type adapted, prior to engagement of the pairs of cooperating dog clutch teeth, to cause synchronous rotation of the parts on which the clutch teeth are formed.

The sliding clutch 5 is actuated through a slider member 15 through a nose or finger 15a which is engaged between cooperating ramps or cam surfaces 16a and 16b formed on a rotary member 16 mounted for revolution about an axis 17. Preferably the nose 15a completely circumvents the member 16; as indicated in the developed showing of Fig. 2 the developed configuration of the nose 15a is generally rhomboidal with rounded corners, and the nose is capable of movement intermediate the enclosing surfaces 16a and 16b, between two end positions one of which is indicated in chain lines in Fig. 2; the full line position of the nose 15a in this figure is an intermediate position.

The rotary member 16 has a gear 18 secured on it which is in constant meshing engagement with a gear 19 rotatable about the axis 20. The gear 19 is rigidly connected with a slidable sleeve 21 and a Geneva cross member 22.

In the normal position illustrated in Fig. 1, the gear 19 is locked when the sleeve 21 integral with it is displaced leftwards and is unlocked when the sleeve is displaced rightwards. The locking means may for example be provided, as shown, in the form of a locking fork 23 cooperating with pins 24 projecting from gear 19.

Axial sliding movement of sleeve 21 is produced by a fork 25 carried by a rod 26 having a finger 27 pivoted in a yoke portion formed on the other end of said rod. The finger 27 is subjected to a lateral biassing action from a tension spring 56 so as to be urged into cooperation with the surface of cam 28 shown in profile in Fig. 4b and essentially comprising lateral ramp surfaces 28a and 28c as well as an end ramp surface 28b, the surfaces being clearly shown in developed form in Fig. 4a. The cam 28 has a gear 29 rigidly connected with it which is rotatable about an axis 30 and is coupled with a gear 31 mounted on a shaft 32 which also has secured thereon a driver 33 for the Geneva cross 22, having a crankpin 34 adapted to cooperate with the radial slots of the Geneva cross member. The shaft 32 is driven in rotation from a source of motive power 35 which desirably is provided by a power takeoff from the main power source or motor 1, as indicated by the chain line 36. In this arrangement, both cam 28 and driver 33 are permanently driven in rotation.

The device so far described operates as follows:

When the finger 27 is applied against the cam 28 by pressure exerted in the direction of the arrow F in Fig. 1, the end projection of the finger drops into the depressed portion of the cam as soon as the cam is brought to a suitable angular position in its rotation, so that the finger engages a point within the stippled area in Fig. 4a. On the finger reaching the point $27_1$ of the cam, it is urged sideways by its spring bias against the ramp 28a, thereby rocking the shaft 26 and the fork 25 in a direction causing unlocking of pinion 19 and gradually bringing the Geneva cross member 22 into position for cooperation with driver 33. When the locking device 23—24 is released, the Geneva cross nevertheless remains blocked by the cylindrical part 33a of the driver until the pin 34 has penetrated into a slot of the Geneva cross.

The angular displacements of the Geneva cross against the angular displacements of the driver crankpin from the instant said pin has engaged a slot of the cross, are illustrated in Fig. 3. The angular displacements of the crankpin 34 are indicated in ordinates at T and the angular displacements of the Geneva cross in abscissae at C. The law of movement of the Geneva cross is represented by the curve 37, and it will be noted that this curve presents a long and gradual inflexion in its intermediate region; in other words, during this phase of its movement the Geneva cross may be regarded as providing a constant reduction ratio, whereas during an initial phase the cross is accelerated and in an end phase it is decelerated, respectively at the beginning and the end of the engagement of pin 34 in a slot of the cross.

It should be noted however that with a conventional Geneva cross mechanism, the drive ratio from the angular displacement of the driver pin to the angular displacement of the cross, during the intermediate phase just alluded to over which such ratio may be considered to remain constant, has no simple value. If, on the other hand the spacing between the axis of the Geneva cross and its driver is varied slightly, a much simpler value can be imparted to said ratio. Thus, if the said spacing is equal or very nearly equal to 1.407 times the throw radius of the crankpin, the ratio from the angular speed of the pin to that of the Geneva cross (which ratio is represented by the slope in the central area of curve 37) is very substantially equal to five twelfths during the stage of substantially uniform displacement.

The above considerations are of particular interest in connection with the forms of embodiment to be described.

As the Geneva cross starts rotating it imparts rotation to gear 19 which in turn rotates gear 18. As a result rotary member 16 is set in rotation and displaces sliding clutch 5 leftwards as shown in Fig. 1, so that dog clutch elements 11 and 13 are disengaged while elements 12 and 14 are engaged. Owing to the action of the related auxiliary clutch 14 which causes the gear 6 to rotate with the same angular velocity as sliding clutch 5, the engagement of clutch elements 10 and 12 is effected in a smooth and noiseless manner. The sliding displacement of the sliding gear 5 is completed when the Geneva cross has completed one quarter of a revolution; this, in the illustrated example which includes ramp surfaces 16a, 16b formed on rotary member 16 enabling the nose 15a to assume two positions, has caused one semi-revolution of the rotary member. Rotation of the Geneva cross takes place during the time finger 27 moves from position $27_2$ to position $27_3$ (Fig. 4a) over cam 28. Meanwhile finger 27 has been lifted clear of the bottom of the cam by ramp 28b. However the finger is prevented from escaping sideways in response to the pull exerted by spring 56 because of the presence of the edge portion 28d. When the finger 27 has been allowed to escape from the edge 28d after the Geneva cross has stopped rotating, it is pulled back sideways by spring 56 towards its initial or idle position. To provide a more positive return movement of the finger the action of spring 56 may be aided by an imperative action exerted by the ramp 28c. In this way the finger is reliably moved to a position completely clear of the cam 28.

The gear-shifting operation is now completed and it can easily be appreciated that upon the finger 27 being engaged afresh with the cam the sliding gear 5 will similarly be displaced in the opposite direction. It will also be noted that the sliding gear 5 is positively locked in each of its end positions, without the necessity of providing any additional expedient for this purpose.

Thus the successive actuations of the finger result each time in a changeover from one to the other possible speed ratio provided by the system. The rate at which the shift is effected depends essentially, in this case, on the rate of rotation of shaft 32, which may be selected at any desired value.

It will be seen that the mechanism of the invention for shifting gears actually constitutes a servo-system powered from the main power plant or from an auxiliary power source of the vehicle and which will be capable of accomplishing additional functions, such in particular, as operating the clutch and the throttle control of the main motor, as will be described in connection with Figs. 5 to 9.

Figs. 5, 6 and 7 illustrate the invention as applied to a two-speed transmission involving a single planetary gear train with full synchronization of the gears, and furthermore provided with means for shifting gears by detent control.

In this embodiment the essential components are the same as in the embodiment described in connection with Fig. 1, and include the Geneva cross member 22 and its driver 33, cam 28, sliding gear or shift member 15, and associated operating rotary member 16.

In the present instance shaft 32 is driven through helical gearings 39 and 40, from the output shaft 4 of the main transmission. The main transmission comprises sun-gear annulus 41 secured to shaft 3, planetary-carrier cage 42 secured on shaft 4, planetaries 43 and main or basic sungear 45 mounted for free rotation on shaft 4.

Slidably mounted on sleeve 45a fast with basic sungear 43 is the sliding gear or shift member 5 provided at its ends with clutch teeth 10 and 11. Clutch teeth 10 are adapted for cooperation with teeth 12 carried on planetary-carrier cage 42, while teeth 11 are shown in Fig. 5 as meshing with clutch 13 provided on the synchronizer gear 46. Gear 46 constantly meshes with gear 18.

Shaft 17 carrying gear 18 moreover has secured to it one of a pair of meshing bevel gears 47 the other one of which is secured on a shaft 48. Shaft 48 in turn carries one of a further pair of meshing bevel gears 49 the other one of which is slidably keyed on a shaft 50

(Fig. 6) whereby the latter shaft is allowed to reciprocate vertically while being rotatable with the last mentioned gear 49. The lower end of shaft 50 has driving engagement with one end of an arm 27a the other end of which has a finger 27 projecting at an angle therefrom. The upper end of shaft 50 is formed with a pair of spaced stops 50A and 50B between which is displaceable a bifurcated support 63 having pivoted to the free end thereof a pawl member 52 formed at its top with a nose adapted alternatively to engage one or the other of two diametrically opposed fixed projecting members 53A and 53B at each successive half-turn of the shaft 50. Pawl member 52 is further provided at its lower end with a pair of bosses 52a and 52b, the latter of which is bifurcated. Applied against boss 52a is a ring 75 slidable on shaft 50 and biassed by a spring 51. Boss 52b is arranged to bear against the upper stop 50B.

The pawl member 52 is held in engagement with the projections 53A and 53B by the cooperation of a spring detent 64 slidably mounted in a recess of the pawl member with the edge of a rotatable disc 54 angularly displaceable by means of a manual lever 65 or the like and formed with a pair of spaced notches 54A and 54B (Fig. 7) spaced around the disc circumference by an angle different from 180°.

In the embodiment being described the rod or shaft 26 has an arm 55 projecting from one end thereof and subjected to the action of spring 56 together with finger 27. The arm 55 is connected through a transmission including a sliding linkage 57a, 57b, with means controlling the operation of the motor driving the drive member of the transmission. Thus in the illustrated example the rod 57b is pivoted to a lever 58 which in turn is pivoted on a fixed pivot 59. Lever 58 operates the clutch 2, e. g. an automobile clutch, which for greater clarity is shown displaced to one side of the general shafting of the transmission, but which actually may either be interposed either on input shaft 3 or on output shaft 4 of the transmission, as indicated by the chain lines 76.

Lever 58 is connected through a link 60, a lever 66 pivoted on a pivot 67 and a link 68, with a throttle control lever 69 attached to throttle valve 61. The throttle may be operated in the conventional way by means of an accelerator pedal 62, for which purpose the pedal is connected with lever 66 through a tubular rod 70 containing an axially slidable piston 71 actuated by a spring 72. A fork 68a allows pedal 62 to be operated without exerting any action on link 60. Conventional dash-pot or similar means 73 are provided for damping the return movement of lever 58.

The operation of the system described above with regard to Figs. 5, 6 and 7 will now be described with particular reference to the explanatory diagrams of Figs. 5a to 5e and 5g, 6a to 6f, 7a and 7ef.

When it is desired to shift gears, lever 65 is manually actuated to bring either one of notches in disc 54, e. g. notch 54A, in cooperating relation with detent 64 of pawl 52 (Fig. 7a). As will be apparent from Fig. 6, the force exerted by spring 51 through ring 75 on the boss 52a of pawl 52 rocks the pawl towards the centre of shaft 50, and in this movement the pawl disengages projection 53A and thereafter shaft 50 is moved downwardly, thereby applying finger 27 against cam 28.

When the finger is able to penetrate into the depression of the cam and is cammed by the ramp 28a, the following effects are produced in continuous sequence, as previously explained in connection with Fig. 1: Gear 19 is unlocked, and Geneva cross member 22 is placed into cooperating relation with its driver 33, 34 (Fig. 5a). At the same time the inner end of sleeve 57a comes into abutment against the end of rod 57b and pushes lever 58, thereby actuating clutch 2 and closing the fuel supply throttle 61 to the engine. The closure of the throttle valve is made possible by compression of spring 72, without it being necessary for the driver to lift his foot off accelerator pedal 62.

At this time the pin 34, as illustrated in Fig. 6a, has not yet penetrated into the slots of Geneva cross 22.

A clear idea of the relative times at which the successive operating stages illustrated in the figures occur, will be obtained by reference to Figs. 8 and 9 which have been drawn on the assumption that shaft 32 of the driver is rotated at a speed six times slower than shaft 4, due to the reduction ratio through gearing 39—40. Cam 28 is driven through gearing 29—31 at a rate selected at one half the value of the rate of rotation of shaft 32, i. e. twelve times slower than the shaft 4 (Fig. 9). Moreover, as previously stated with reference to Fig. 1, it is assumed that the reduction ratio through gearing 18, 19 is two to one, that is, the gear 18 effects one half revolution when gear 19 effects one quarter of one revolution. Furthermore, in the selected example, the number of teeth of synchronizer gear 46 should be 2.5 times less than that of gear 19, so that as gear 19 effects one quarter turn in being driven from Geneva cross 22, gear 46 accomplishes five-eighths of a revolution in all.

It will further be recalled that the spacing between the axes of the Geneva cross and its driver is so selected that, throughout the substantially uniform period of rotation of the cross, five degrees of rotation of the pin 34 correspond to twelve degrees of rotation of the Geneva cross.

Under the conditions stated, one complete cycle or revolution of cam 28, i. e., the complete gear-shift operation, corresponds to two revolutions of driver 33, 34. The driver however effectively acts upon the Geneva cross only during one quarter of a revolution.

Owing to the arrangement of ramp surfaces 28a, 28b shown in Figs. 4a and 4b, during the particular revolution of driver 33 taken as a reference in Fig. 8, the finger 27 is able to engage cam 28 throughout the arc I of the path of rotation of the driver which extend from radius $o_1$ to $o_2$. Over arc II ($o_2$ to $a$), the operations described in connection with Fig. 5a take place and the angular position of pin 34 in Fig. 6a corresponds to this radius $a$.

From $a$ to $b$ (arc III), as shown in Figs. 5b and 6b, the Geneva cross 22 is started rotating, causing through gear 19 rotation of gear 18 and of member 16 and thence, through bevel gearings 47 and 49, rotation of shaft 50. Shaft 50 thus starts revolving in the direction indicated by arrow $f$ in Fig. 7a, at the same speed as shaft 17 carrying pinion 18. At the same time gearing 46 which theretofore had been blocked by gear 19 owing to the lock arrangement 23, 24, now rotates at an accelerated rate in proportion to the acceleration imparted at this time to the Geneva cross 22.

Due to the axial displacement of sliding member 15 the dog clutches 11, 13 commence to separate. As the pin 34 reaches position $b$ and throughout the arc IV (Fig. 8), the speed of gear 46 remains substantially equal to that of shaft 4. This is so because at this time (Fig. 9) the speed of rotation of the Geneva cross is equal to $1\frac{2}{5}$ times the rate of rotation of shaft 32 and, since gear 46 is rotating 2.5 times faster than the Geneva cross, the speed of rotation of gear 46 has now caught up with that of shaft 4, since shaft 32 is rotated six times slower than shaft 4

$$\left(\frac{12}{5} \times 2.5 = 6\right)$$

Continued axial displacement of slider member 5 from position $b$ to position $d$ will therefore permit full interengagement of clutch teeth 10 and 12 without requiring that clutch teeth 11, 13 be disengaged. In this way a continuous transmission of movement from shaft 3 to shaft 4 may be achieved, and the gear shifting operation is effected in complete synchronism and without any transition through a dead centre.

In the position c (Fig. 5c), clutches 11, 13 and 10, 12 therefore also are in engagement. In the d position of driver 33 (Figs. 5d and 6d), the clutch members 11 and 13 separate, while clutch members 10 and 12 engage with each other more completely. From d to e (arc V, Fig. 8), the rotation of the Geneva cross comes to an end and consequently gear 46 is also brought to rest as well as member 16 which acts to complete the engagement of clutch members 10, 12. The rotation of shaft 50 is also completed and pawl 52 is then brought to a position, as indicated in Fig. 7ef, adjacent to projection 53B, though not yet in engagement therewith.

Throughout the arc VI extending from e to f, and possibly through part of the preceding arcs, the ramp 28b acts to move finger 27 away from the bottom of the cam, thereby causing an upward movement of shaft 50. The pressure exerted on this shaft, which overcomes the pressure of spring 51, now acts through stop 50B on boss 52b (see Fig. 6f) of pawl 52, so that, notwithstanding spring 51, the pawl, during its upward movement towards projecting 53B, simultaneously tends to rock away from shaft 50. The pawl then slides along the lower surface of the projection. Detent 64 engages disc 54 in a solid area of this disc and is consequently retracted within pawl 52, thereby allowing the pawl to engage with projection 53B. As soon as this engagement has taken place, the detent 64 is allowed to project from its housing recess and locks pawl 52 in its new position by cooperation with the edge of disc 54.

As previously indicated, the shaft 50 now again being stationary, the ramp 28b is allowed to push the the finger 27 aside, with the assistance of spring 56. In this movement (arc VII from f to g and Fig. 5g), the Geneva cross 22 is disengaged from the driver 33 and gear 19 again is locked by the cooperation of clutch teeth 23 and 24 (Fig. 5g). Since arm 55 has been retracted by spring 56 together with finger 27, the parts 57a and 57b of the sliding linkage move apart and the clutch 2 is urged to coupled condition by the clutch spring; at the same time spring 72 moves the throttle 61 to its open position assuming the accelerator pedal has not been displaced. Both return movements are damped by the damper or dash-pot 75 thereby achieving smooth operation.

In the initial condition (Fig. 5) the main sun gear 45 was blocked by the blocking of gear 19 owing to the action of clutch members 11, 13 and gears 46 and 18. The planetary gear train 41, 42, 43 and 45 therefore transmitted the drive to driven shaft 4 at a reduced ratio.

At the end of the gear-shifting operation (Fig. 5a), the planetary cage 42 is rigidly connected through sliding clutch member 5 with the main sungear 45. At this time therefore, the planetary train is blocked and provides a direct drive from shaft 3 to shaft 4, both shafts revolving at the same velocity.

In order to change over to the step-down drive condition, it is only necessary to bring notch 54B to a position facing detent 64.

All of the previously described stages of operation are repeated except that the synchronizer gear now catches up with the speed of main sungear 45 in order to arrest and block the sungear, while slide clutch member 5 is moved in the reverse direction. Pawl 52 again effects a semi-revolution in the same direction as before (arrow f) to resume its original position.

Thus, at each shifting of gears, the pawl effects one half-turn so that to each available gear ratio there corresponds the same position of the pawl.

It will be noted moreover that gear 46 is at each shifting rotated ⅝ of one turn, as previously stated, so that the number of cooperating teeth in the clutch members 10, 12 on the one hand, and 11, 13 on the other, should equal eight or an integral multiple of eight, in order that the pairs of clutch dogs may each time become reengaged after the gear has rotated.

Figs. 10 to 19 depict one practical construction of a gearbox involving the arrangements hereinabove described.

The gearbox illustrated in these figures comprises two assemblies similar to that described with reference to Figs. 5, 6 and 7, the first assembly being designated with the same reference numerals as those used in these figures, while the second assembly is designated with those numerals plus one hundred.

In this embodiment both drivers 33 and 133 are rigidly interconnected and located on opposite sides of a helical gear forming part of a pair of meshing gears 40 which in turn receives movement from a pair of meshing gears 39 having one of its gears keyed on shaft 4, the latter gears being illustrated in Fig. 10 as located between the two planetary gear sets. The first set, shown at the left on Fig. 10, is similar in construction to the diagrammatic showing in Fig. 5. The second set however, to the right of the figure, is constructed somewhat differently.

In this set both sungears 141 and 145 are external gears. The planetary carrier 142 is disposed between the sungears and carries the coupled planetaries 143 meshing with each of the sungears. Secured on each shaft of planetaries 143 is a further planetary 200 adapted to cooperate with a third sungear 201 of the same set, which third sungear is slidable on output shaft 202 under the action of control fork 203.

Auxiliary sungear 201 is provided with dog clutch members 204 which when displaced to left act to couple sungear 142 with output shaft 202 (forward drive position). In the intermediate position of sungear 201, as illustrated in the drawing, the output shaft 202 is disengaged and the transmission is in dead centre. When shifted rightwards, sungear 201 cooperates with the sungears 200 and the rotation of shaft 202 effected through planetaries 200 and auxiliary sungear 201 provides for reserve drive.

In the second planetary gear-train, the planetary carrier 142 is keyed to the shaft 4. The sungear 141 is rotatable about the output shaft 202 when said sungear is not engaged with sungear 201 through the dog clutch 204. Sungear 145 is rotatable with respect to shaft 4 and is at all times connected for rotation with sliding clutch 105, on the one hand owing to the fact that the clutch 105 is slidingly splined on a sleeve 145a forming an extension of sungear 145, and on the other hand owing to the action of drive pins 110 which extend through the flange of the sungear and are equivalent in function to the clutch teeth 10 in the previously described embodiment.

The sliding clutch 105 is adapted when moved to its leftward position (as illustrated in Fig. 10) by means of the slider member 115 operated through a part 115a, to be connected for rotation with synchronizer pinion 146 owing to engagement of clutch teeth 111, 113; when in its rightward position the sliding clutch member 105 will block sungear 145 for bodily rotation with planetary carrier 142, the drive pins 110 in this condition projecting into sockets 112 formed in said carrier and serving a function equivalent to clutch teeth 12 of the previous embodiment.

It will thus be seen that the planetary gear train just described is capable of providing both a reduced drive ratio and direct drive, similarly to the train described in connection with Fig. 5.

In the gearbox shown in Fig. 10, pinions 19 and 119 (only the former one of which is shown) which normally are blocked by fixed gear sectors such as 23, adapted to cooperate with the teeth of said pinions, are arranged coaxially and have secured to the adjacent faces thereof Geneva cross members 22 and 122 (only the former shown in Fig. 10). The pinions 19 and 119 directly drive the gears 46 and 146 which serve in turn to rotate gears 18 and 118. The slide-blocks 15 and 115 constitute sleeves surrounding the central portions of slide gears 5 and 105 respectively.

One pinion of each pair of meshing bevel gears 47 and 147 is formed integrally with each of the gears 18 and 118 respectively. The said pinions are adapted through shafts 48 and 148 (only the latter visible in Fig. 11) to rotate, through gearings 49 and 149, the selector shafts 50 and 150 (only shaft 150 visible in Fig. 11). The shaft 32 common to both drivers 33 and 133 rotates both cams 28 and 128 (only cam 128 is visible in Fig. 10) through spur gearings 29—31 and 129—131.

Both cams are identical in size but oppositely, i. e. symmetrically, arranged, and each is constructed in the manner diagrammatically illustrated in Figs. 4a and 4b; thus, as will be apparent from Fig. 11, cam 28 includes the ramp surfaces 28a, 28b and 28c as well as the projecting edge 28d. However, for the purpose of ensuring a correct positioning of fingers 27 and 127 against ramps 28a and 128a and preventing occurrence of a condition wherein an uncertainty might exist as to whether or not the finger is properly engaged with the ramp 28a, as might otherwise occur in case the gear-shifting operation were to be effected at the precise instant the finger 27 has reached the edge of ramp 28a, each cam 28 and 128 is provided with an inturned flange as at 28e and 128e respectively, the configuration of flange 28e being clearly illustrated in Fig. 12.

Moreover, each finger such as 27 (Fig. 11) carries a pawl 77 formed with a nose or heel 77a and biassed by a spring 78. The nose in the normal position of finger 27, that is when the finger is subjected neither to the action of spring 51 nor to the action of the ramp surfaces, is situated adjacent the inturned part 28f of flange 28e.

As the cam 28 rotates in the direction of the arrow in Fig. 11, the extremity of finger 27 is adapted to drop directly into the depressed portion of the cam 28 at the time the part of cam 28 which corresponds to the portion occupied by ramp 28c (see shaded portion of Fig. 4a) is presented adjacent to said finger. The finger can in no case engage the recess of the cam as the projecting part formed by ramp 28a is presented adjacent the finger. The inturned flange 28e prevents any uncertainty as to engagement of the finger in the initial part of the ramp 28. This is because, at the time finger 27 is actuated by spring 51, should the nose 77a drop on to the upper face of the inturned portion 28f, then the pawl will be prevented from effective engagement and will have to remain in a condition of expectation until such time as the cam has completed another revolution before it can effectively engage the cam. On the other hand, if the nose 77a is presented to the cam prior to the passing of the nose 28g of the inturned portion 28f, then it will be engaged by the nose and the finger 27 is driven in a positive manner into the recess of the cam as shown in Fig. 12 in broken lines. (It is noted that in Fig. 11, for the sake of clarity, the gear 29 has been shown located behind the cam 28 whereas actually the gear is situated in front of the cam.)

In Fig. 10, the output shaft 202 is arranged, through a pair of meshing helical gears 206, to drive an obliquely extending intermediate shaft 207 the free end of which may be used to drive an R. P. M.-indicator. The shaft 207 drives through a further pair of helical gears 208, the shaft 209 of a centrifugal type speed governor. The governor comprises a pair of opposite pivoted arms 210 (only one of which is shown in Fig. 10), carrying at their free ends weight members 211 pivoted in ball bearings. The weights are adapted to ride over the surfaces of ramps 212a formed on a cover 212 placed over the end of the governor shaft, and mounted for axial displacement with respect to said shaft. Balls 214 interposed in axially extending runways between the shaft and the cover 212 provide for the displacement of the cover relative to the end of the shaft. The cover 212 is biassed by a spring 213 away from the shaft 209. Thus, as the speed of rotation of shaft 209 increases, the spring 213 becomes more greatly compressed, and vice versa.

The axial displacements of the cover member 212 are transmitted through a fork 216 engaging a groove 215 in the cover (see Figs. 10 and 19) to a shaft 217 connected to the fork and carrying a crankarm 218. The purpose of this arrangement is to provide for automatic gear shifting operation, as will be later described in detail.

The construction of the selectors diagrammatically illustrated in Fig. 6 and described above in connection with that figure, is shown in detail on Fig. 11 with respect to the particular selector controlling the arm 127a. The figure shows the bifurcated support 163 carrying the pawl 152 and the bosses 152a and 152b serving to rock the pawl towards the shaft 150 under the pressure of spring 151, and away from the shaft during the upward movement of arm 127a.

The outer end of the locking detent plunger 164 associated with the pawl, in this construction is terminated in two cylindrical parts of different diameter, 179 and 180 (79 and 80 in respect to detent plunger 64), adapted to cooperate with the edges of two separate discs, 181 and 182 respectively. The discs are notched in a manner similar to the disc 54 in Fig. 6 for releasing the gear shifting operation, and are adapted to be adjusted in angular position by means of pinions 181₁ and 182₁ secured thereto, and respectively cooperating with dual gear sectors 219 and 220 (see in particularly Fig. 19), adapted to be rotated independently of each other about a common axis formed by the shaft 221.

Gear sector 219 is driven from crankarm 218 through a mechanism to be later described in detail, whereas sector 220 connected with shaft 221 is arranged for manual actuation by the driver through a lever 222 projecting from the gearbox (see Fig. 16).

It can immediately be noted that discs 81 and 181 (also see Fig. 20) are formed as simple flat discs, whereas discs 82 and 182 are formed with flanges 82a and 182a respectively, terminating in ramps 82b and 182b adapted to press the detent plungers 64 and 164 into their respective recesses within pawls 52 and 152.

With the plungers in projected condition, the cylindrical parts 79 and 179 thereof are in position to cooperate with the discs 81 and 181, so that the initiation of the gear-shifting operation is placed under the control of these discs. On the other hand with the plungers retracted by the action of the ramps the parts 79 and 179 are retracted and the end portions 80 and 181 now cooperate with the flanges of discs 82 and 182.

Shafts 50 and 150 are provided at their upper ends with caps 83 and 183 (see Figs. 11 and 14) formed on their under faces with bosses 83a and 183a. Engageable under the flanges of the caps are the two noses 223a of a lever 223 (see Fig. 18) secured to a shaft 224 projecting from the gearbox and terminating in a lever 225 (Fig. 16) arranged for manual actuation by the driver.

Thus, even though the notches in discs 81 and 181, and discs 82 and 182, are able to effect a release of the plungers 64 and 164, the gear shifting operation can only be effectively initiated if the rotation of lever 223 has caused the two noses 223a of said lever to disengage the flanges 83 and 183 and thereby allowed the shafts 50 and 150 to move downwards (Fig. 14).

Lever 223 is normally subjected to the indirect action of a biassing spring 226 (Fig. 23) which urges the noses into engagement with the under faces of the flanges. However, the noses 223a are formed with flanges or lips 223'a which are adapted to slide along the edges of the flanges 83 and 183a during the downward movement of the latter, so that the noses of lever 223 are unable to become enaged with the upper surface of said flanges 83 and 183, a condition which would prevent the shafts 50 and 150 from moving up again. The noses 223a therefore are only able under the action of spring 226 to return to their positions in engagement with the under faces of the flanges 83 and 183.

Rotatable coaxially with shaft 224 (Figs. 16 and 18) is a sleeve 227 having one end projecting out of the gearbox for actuation by the lever 228. The sleeve has secured to it a lever 229 formed with two noses 229a also adapted for engagement with the under faces of flanges 83 and 183, along the diameters of the flanges on which the bosses 83a and 183a are always located in the stationary condition. It will be recalled in this connection that the shafts 50 and 150 complete one semi-revolution at each actuation thereof, and that with each position of these shafts there always corresponds a particular gear ratio combination for the related planetary gear train.

The sleeve 227 therefore can only be rotated by means of the lever 228 into the position shown in Fig. 18, wherein neither one of the bosses 83 and 83a opposes the displacement of lever 229. Should one or both of these bosses lie in the position diametrically opposite from that illustrated then the rotation of sleeve 227 is prevented. As will be later explained, the position of the bosses shown in Fig. 18 is the one corresponding to first speed.

The sleeve 227 also has projecting from it a bifurcated arm 229b (Fig. 16) having pivoted to it a link 232 serving to actuate the slide-block 233 carrying the fork 203.

In the position illustrated in Fig. 18, as also in Fig. 10, the fork 203 is holding the sliding gear 201 in its dead centre position. It will be realized in Fig. 18 that the displacement of lever 228 in the direction indicated by the arrow AV (serving through fork 203 to engage the clutch teeth 204) moves the noses 229a away from the flanges 83 and 183. All the available gear ratios can therefore be obtained for forward drive.

However, when the movement of lever 228 moves the fork 203 in the direction indicated by arrow AR, it will first be noted that such movement is only possible provided the position of bosses 83a and 183a does not prevent it, that is, provided the transmission has first been shifted to the first forward speed condition, and secondly, that the positioning of noses 229a under the flanges 83 and 183 will prevent any subsequent shift from the selected drive combination.

In the absence of the safety measure just described the engagement of sliding gear 201 with the sungears 200 might not result in the achievement of the desired reduced drive ratio in reverse.

In the practical construction of the gearbox illustrated in the drawings, both shafts 26 and 126 which carry the forks 25 and 125 serving to operate the Geneva cross members 22 and 122, are biassed by a common return spring 56 (see Figs. 16 and 17). This spring is anchored at its opposite ends to levers 84 and 184 secured to the shafts 26 and 126 and provided with noses 84a and 184a respectively, which exert pressure on fingers 85 and 185 respectively projecting from sector gears 86 and 186 mounted for free rotation on the shafts 26 and 126 and biassed by a spring 278 into contact with fingers 85 and 185. The sector gears 86 and 186 are in meshing engagement and one of the sectors has swivelled to an extension 86a thereof, through a ball-and-socket joint 234 (Fig. 16), one end of a rod 235 the other end 235a of which is positioned adjacent to the free end of a crankarm 236 (Fig. 17) secured on a shaft 237 which further supports a lever 238. The lever 238, equivalent in function to arm 55 shown in Fig. 5, is adapted to act upon the clutch and the control lever associated with the fuel supply throttle of an internal combustion motor driving the drive shaft of the transmission, as previously explained in connection with Fig. 5a. However, the end 235a of rod 235 extends through a terminal eye 239a (Fig. 16) formed in a rod 239 suitably guided for axial sliding movement and having one end pivoted to lever 229.

Thus, regardless which one of the selectors is actuated, and also in the event both selectors are simultaneously actuated in the operation of the gearbox, the following two results are always achieved: first, the forks 25 and 125 are always returned by the common spring 56 to their normal inoperative positions (wherein the Geneva cross member is disengaged), and, secondly, through the action of sectors 86 and 186, the rod 235 always operates lever 238 which will serve to accomplish the auxiliary operations accompanying the gear shift (de-clutching and deceleration of the motor to idling condition), provided the extremity of rod 235 is positioned adjacent to the crankarm 236. Now, as will be apparent from Fig. 18, rod 235 is spaced from the crankarm in the Dead-Centre and Reverse conditions of the gearbox, and is only positioned for cooperation with the crankarm in the Forward Drive condition thereof.

The arrangement just described has the following advantage. On the one hand, driving manoeuvres effected in reverse gear are only occasional and must be performed with care and precision, and accordingly are herein performed under intentional control of the driver since the driver must manually operate the clutch and the accelerator pedals; secondly, in case of an accidental stalling of the motor during a shifting of gears, with the fork 203 already in the forward drive position, then the arrangement described makes it possible to return the transmission to dead centre and thereby restore a condition in which the gearbox is coupled to the motor (cancelling the action of lever 238) while being uncoupled from the drive wheels. After the motor has been re-started, therefore, it will be possible to complete the gear-shift operation previously initiated.

The gearbox controls just described are visible as a whole in Fig. 13 from which a general idea of their overall dimensions and relative positions can be gathered.

Before describing in detail the operation of the two selectors, reference may first be had to Fig. 22 which will give a clearer understanding of the function performed by the selectors in selecting the particular ratio to be used.

It will be recalled that at each gear shifting operation involving either one of the planetary trains, the sliding clutch 5 or 105 associated with that train is displaced rightwards or leftwards according to Fig. 10, while the corresponding selector pawl effects a 180° pivotal movement, in a constant direction, so that the same position of the pawl always corresponds to the same position of the sliding clutch.

With sliding clutches 5 and 105 in the position shown in Fig. 10, that is, both positioned close to the gearing 40 (which gearing may be regarded so to speak as forming a plane of symmetry for the gearbox), both planetary trains operate to provide the low-gear drive therethrough so that the over-all drive ratio through the gearbox corresponds to lowest gear, or first. This is clearly indicated in Fig. 22a. Moreover the reduction ratio provided by the rightward one of the gear trains in Fig. 10 is greater than that provided by the left one of said gear trains.

To shift into second gear, the left train is engaged whilst the right train is allowed to remain in its low-ratio condition. As shown in Fig. 22b, the position of pawl 52 reverses and the sliding clutch 5 is moved away from sliding clutch 105. Pawl 152 remains stationary.

To shift into third gear, the left train is restored to its low-ratio condition, while the right train is engaged. As shown in Fig. 22c, the relative positions of pawls 52 and 152 are then reversed with respect to the foregoing condition. The sliding clutches 5 and 105 have been moved simultaneously towards the right.

In fourth gear, both trains are engaged (Fig. 22d). Both pawls 52 and 152 are in the opposite positions from those in the first-gear condition, and both sliding clutches 5 and 105 are spaced a maximum amount.

Thus the diagrams of Fig. 22 indicate that each successive stepping up of the drive ratio from first to fourth gear, involves a reversal in the position of pawl 52, whereas pawl 152 only reverses its position when shifting from second to third gear.

The movements of the pawls, as just described, may be conveniently summarized in the manner indicated in Fig. 22e, wherein the uppermost position of the outer ends (79 and 80, and 179 and 180) of the detent plungers 64 and 164 respectively correspond to the gear combinations 1–3 and 1–2, whilst the lowermost positions of said outer ends of the plungers respectively correspond to the combinations 2–4 and 3–4.

In order to provide a clearer picture of the movements of the two selector levers and, more broadly, of the type of gearbox herein disclosed, the relationship between the gearbox and the driver's station has been illustrated in Fig. 23.

The figure shows, outwardly of the gearbox, the levers 222, 225 and 228, which were described particularly with reference to Fig. 16, as serving to control the actuating members of the gearbox from without.

Lever 228 which serves to act on fork 203 is connected by a link 240 with a tube 241 adapted to be rotated by means of a lever 242. In the position shown in Fig. 23, this lever is in its dead centre position. When this lever is pushed forward, the gearbox is put into "first gear," and when pulled back, into "reverse." Coaxially with the tube 241 is a rod 243 which may be actuated by means of a second hand lever 244.

In a manner to be explained with reference to Figs. 24 and 25, the rod 243 is adapted to be pivoted about its axis or to be displaced longitudinally. The rod acts through a crankarm 245 and a lever 246 on the lever 222 rigidly connected with shaft 221, whereby the dual sector 220 may be manually rotated for rotating both discs 82 and 182.

If rod 243 is displaced longitudinally, lever 225 is actuated through bell-crank lever 247, in order to disengage the noses 223a of lever 223 from under the flanges 83 and 183 in the manner previously explained.

The part of the mechanism just described together with the lower part of Fig. 20, provides an understanding of the manner in which the gearbox is placed in any one of its drive ratio conditions.

If from the initial position shown in Fig. 23, the lever 244 is rotated in the direction indicated by arrow 248, the dual sector 220 will pivot in the direction shown by arrow 249, and consequently both discs 82 and 182 will revolve as shown by arrows 250.

The plungers 64 and 164 are pressed into their recesses by the left-hand ramps 82b and 182b (as shown in Fig. 20), of discs 82 and 182, so that only the end portions 80 and 180 of the plungers (illustrated in the first-gear position in Fig. 20) remain in contact with discs 82 and 182, while the portions 79 and 179 of the plungers disengage the edges of discs 81 and 181 shown in the upper part of Fig 20. If lever 244 is successively moved to the positions indicated by the marks 251 in Fig. 23 (corresponding to 1st, 2nd, 3rd and 4th gears), the diameters designated by the circled figures 1, 2, 3 and 4 of discs 82 and 182 are brought into alignment with the plunger portions 80 and 180. However, even though the plungers are released for movement by the notches in the discs during this movement, the shafts 50 and 150 cannot move unless released by means of the lever 223.

Should lever 244 be arrested in any one of the positions designated by the markings 251 (Fig. 23), for example in position "3" (3rd gear), and if an upward action is then exerted on the end of lever 244, then lever 223 acts to release the shafts 50 and 150. At this time the plunger or plungers 64 and/or 164 which has a notch of the disc positioned opposite to it can be reversed in position; specifically, as shown in Fig. 20, the plunger portion 80 remains in position, hence pawl 52 does not alter its position, while plunger portion 80 having a notch positioned adjacent to it, is shifted to the diametrically opposite position.

Referring to Fig. 22c, it will be seen that the gearbox has now effectively been brought into the condition corresponding to 3rd gear. The action of the release means constituted by lever 223 therefore makes it possible to shift manually up or down the whole range of available gears without the necessity of passing through all intermediate gears.

If the lever 238 is connected with the clutch of the vehicle and with the throttle control, the gear shifting operations may be rendered automatic by simply actuating lever 244. If furthermore a governor is provided, the time at which the gear shift is performed is automatically selected by the governor without any manual intervention on the part of the driver, except for starting. Finally, if an automatic clutch is used, manual control may be eliminated even in starting.

For automatic gear shifting operations, the governor-responsive lever 218 is connected with motor 219, preferably in the manner illustrated in Fig. 21.

As shown, rotatably mounted on shaft 221 having the sector 220 secured thereon, is a sleeve 252 which has secured to it the sector 219, and also a crank-arm 253 which thus is adapted to cause rotation of said sector (also see Figs. 13 and 16). At a point above the sleeve 252, the shaft 221 has connected to it a further crank-arm 254 which is rotated together with disc 220 by the lever 244 (see Fig. 23). The crank-arm 254 is connected (Fig. 14) through a link 255 to one branch 256 of a lever pivoted on pivot 217, through a sleeve 257 rotatable on said pivot. The other arm 258 of the lever is connected by a rod 259 to the pivot pin of a two-part link 260a–260b which connects the ends of the crank-arms 253 and 218 to provide an adjustable-length connection between said crank-arms.

Depending on the position of lever 244 and hence in accordance with the position of rod 259 connected thereto by the transmission described, the two parts 260a and 260b of the two-part link will assume a variable angular position with respect to each other, thereby varying the distance between the ends of crank-arms 253 and 218 that are connected through the two-part link.

For automatic operation of the gearbox, the lever 244 is brought to the position illustrated in Fig. 23, i. e. such that the discs 82 and 182 assume the positions shown in the lower part of Fig. 20, wherein the end portions of plungers 64 and 164 are disengaged so that parts 79 and 179 engage the edges of discs 81 and 181.

In this condition, the discs operate to control the gear-shifting operations.

The inherent speed of the vehicle is measured by the speed governor and, through the linkage illustrated in Fig. 21, the discs 81 and 181 are rotated in the direction indicated by the arrows 261, through an angle substantially proportional to the speed of the vehicle. At this time, as will be explained with references to Figs. 24 and 25, the lever 223 is disengaged, so that the selectors are allowed to operate freely. The notches formed in the edges of discs 81 and 181 then automatically function to enable the gear shifting operations.

Considering for instance disc 81, as the radius of the disc indicated by circled numeral 2 assumes a position facing part 79, this part reverses its position and the gearbox provides the second gear ratio combination, and thereafter the third gear combination as the radius "3" of the disc 81 during continued movement of this disc has reached a position facing the part 79 in the newly assumed position of this part. The radius designated by circled 4, on reaching a position facing part 79 now positioned as illustrated, produces a shift into fourth gear.

Conversely, the gearbox will automatically be stepped down through the range of gear ratios, being shifted into third gear when the radius circled 3' is presented adjacent to the part 79 and, similarly, being shifted into second gear as the radius 2' passes through a similar position. In other words, owing to the relatively wider size of the notches formed in disc 81, the gearbox is stepped up through the range of available gear ratios, at M. P. H. velocities that are respectively higher than the velocities at which the box is shifted down through the corresponding gear ratios, in accordance with the usual and rational procedure in driving automobile.

Moreover, as a result of the linkage arrangement shown in Fig. 21, the upward and downward gear shifts may selectively be caused to occur at earlier or later times. Thus, referring to Fig. 23, the lever 244 when in the position illustrated causes the gears to be shifted at higher M. P. H. speeds ("speed" driving as indicated by the letter S on the casing 262 carrying the lever 244). If the lever is pulled back to the position indicated V ("city" driving) the gear shifts are made to occur at respectively lower vehicle speeds.

The casing 262 containing the lever 244 may be constructed as illustrated in Figs. 24 and 25. The lever 244 is pivoted by means of a shaft 262 on a part 264 secured to the end of rod 243. Housed in a recess within lever 244 is a ball 265 which is adapted to engage frictionally the under surface of an upper flange 262a of the casing. This flange is formed with notches indicated at 1, 2, 3 and 4. As already described, the tension force of spring 226 acts both to engage the lever 223 beneath the flanges 83 and 183, and also to urge the rod 243 upwards according to Fig. 25; the rod however is arrested in its upward movement by engagement of nose 264a with lever 244.

To produce a shift into a selected gear when the lever has been placed in any one of the positions 1 to 4, the end of lever 244 is raised, which acts in opposition to spring 226 to operate lever 225 for displacing lever 223. In order to bring lever 244 to the position corresponding to automatic operation, i. e. between positions "S" and "V," said lever is likewise raised whereby the flange 264b may be engaged under the flange 262b, to hold lever 244 in its raised position (as illustrated in Fig. 25) and thereby permanently suppresses the action of lever 223 upon the axial displacements of shafts 50 and 150.

Moreover, the crank-arm 256 shown in Fig. 21 may be connected to the accelerator pedal of the vehicle, so that the instant at which gears are shifted in the automatic condition will at any time depend on the position of the accelerator pedal. In other words, according as this pedal is more or less depressed, the gear shifting operations will be performed in a more or less advanced or delayed manner.

In the exemplary embodiments of a gearbox described, manual and automatic operations are selectively achievable. It will be obvious that in the event only one of these modes of operation is desired, substantial simplifications may be introduced into the system, and a number of parts and connections may then be omitted.

It will also be understood that many alternatives may be made in the constructions illustrated and described without departing from the scope and spirit of the present invention.

What I claim is:

1. In a power transmission comprising a frame, a first shaft revolubly borne in said frame; a first gear idly borne on said first shaft having dogs on one side thereof; a second gear idly borne on said first shaft on the dog side of said first gear, having a tubular hub; and a coupling sleeve having dogs facing said dogs for interengagement therewith, said sleeve being mounted on said hub with a sliding fit therewith, so as to rotate with said hub and also to be capable of being shifted along the same from an operative position corresponding to interengagement of said dogs on said first gear and said sleeve, to another position and conversely; the combination of a third gear borne in said frame both for revolution and for axial sliding movement from an operative position to an inoperative position and conversely; a driven element fast with said third gear; an auxiliary shaft revolubly borne in said frame, having a driving element thereon, arranged for operatively engaging said driven element only when said third gear is in said operative position; a gear connection between said first shaft and said auxiliary shaft for permanently rotating said auxiliary shaft from said first shaft as said first shaft rotates; means coupled with said auxiliary shaft, responsive to remote control, for shifting said third gear from said inoperative position to said operative position thereof, maintaining the same in said operative position while said driving element performs a predetermined amount of rotation, then shifting said third gear back to said inoperative position thereof; a fourth gear between said first and third gears, in permanent meshing engagement therewith; and means between said fourth gear and said sleeve, responsive to rotation of said fourth gear for shifting said sleeve from either of said two positions thereof to the other one; the gear ratio in said gear connection and between said driving and driven elements as well as between said third and fourth gear being so predetermined that said first gear when rotated is moved at the same angular speed as said first shaft.

2. In a power transmission from a drive to a driven shaft, a gear means, comprising a planetary gear train, controllable for enabling at least two different drive ratios through said transmission, means controlling said gear means and shiftable between two positions in which respective drive ratios are enabled by said gear means, a stepwise displaceable member adapted at each step of displacement to shift said controlling means from its present to its other position, means for normally blocking said member, a source of motive power, and operating means actuatable to couple said member with said auxiliary source and simultaneously to disable said blocking means, and thereafter to uncouple said member from said source and simultaneously enable said blocking means, whereby each actuation of said operating means will impart one step of displacement to said member and will shift said controlling means from its present to its other position.

3. In a power transmission from a drive to a driven shaft, gearing controllable for enabling at least two different drive ratios through the transmission, means controlling said gearing and shiftable between two positions in which respective drive ratios are enabled by said gearing, a stepwise rotatable member adapted at each step of rotation to shift said controling means from its present to the other one of its positions, a source of motive power, a driver member permanently driven therefrom, said member being shiftable between a first condition in which it is engaged with said driver to be rotated stepwise therefrom, and a disengaged condition, a cam permanently driven from said power source, a cam follower movable into and out of engagement with said cam, and an operative connection from the follower to the member, said follower when in engagement with the cam being adapted to assume a first and a second position in which said member is shifted through said connection to its engaged and its disengaged conditions respectively, means on said cam operative at a predetermined point of the rotational cycle of the cam to move said follower when in engagement with the cam from said first to said second position thereof, operating means actuatable to move said follower into engagement with the cam, and means adapted to move the follower out of engagement with the cam at the end of the cam's rotational cycle, whereby each actuation of said operating means will impart one step of rotation to said member and will shift said controlling means from the present one to the other one of its positions.

4. In a power transmission as claimed in claim 3, spring means biasing said follower out of engagement with the cam.

5. In a power transmission as claimed in claim 4, means on said cam for preventing said follower from responding to said biasing action until the end of the cam's rotational cycle.

6. In a transmission as claimed in claim 4, means on said cam for preventing said follower from responding to said biasing action until a point near the end of the cam's rotational cycle, and further means on said cam for then positively moving said follower out of engagement with the cam.

7. In a transmission as claimed in claim 2, dog clutch means on said controlling means, and cooperating dog clutch means on said gear means adapted to engage with said first mentioned dog clutch means in each position of the controlling means, and synchronizing means adapted to synchronize the rotation of said controlling means with that of said gear means prior to engagement of said dog clutch means in either of said positions.

8. A transmission as claimed in claim 7, wherein said synchronizing means include a synchronizer pinion, and means for rotating said pinion from the stepwise rotatable member.

9. In a power transmission from a drive to a driven shaft, a planetary gear train having a first sungear rotatable with one of said shafts, a planetary-carrier rotatable with the other of said shafts, a second sungear rotatable with respect to said shafts and planetaries rotatably supported on said carrier and meshing with both said sungears, controlling means shiftable axially of one of said shafts between two positions in one of which said second sungear is blocked for rotation with said carrier and in the other one of which said second sungear is held relatively stationary, a stepwise rotatable member adapted at each step of rotation to shift said controlling means from the present one to the other one of its positions, a driver member and means for continually rotating the latter, said first member being axially shiftable relative to said driver member between a position in which said first member is drivably coupled with said driver member and a position in which it is uncoupled therefrom, cyclically operative means operative when enabled to produce first a shift of said first member to its coupled position to have a step of rotation imparted thereto and operative after a predetermined period to produce a shift of said first member back to its uncoupled position, whereby said controlling means is shifted from the present one to the other one of its said positions, and operating means adapted at each actuation thereof to enable said cyclic means.

10. A power transmission as claimed in claim 9, wherein said controlling means is rotatable with, and axially shiftable with respect to, said second sungear, a synchronizer pinion freely rotatable with respect to said shafts, dog clutches on axially opposite sides of said controlling means, a dog clutch on said carrier adapted for cooperation with one of said first mentioned dog clutches in one position of the controlling means and a dog clutch on said synchronizer pinion adapted for cooperation with the other of said first mentioned dog clutches in the other position of said controlling means, and a gear drive from said stepwise rotatable member to said synchronizer pinion.

11. In a multi-speed power transmission from a drive shaft to a driven shaft, at least two planetary gear sets in cascade relation for transmitting the drive serially from said drive to said driven shaft and each having two conditions for providing two different ratios for the drive transmitted therethrough, a controlling means associated with each set and shiftable axially between two positions in each of which a respective one of said drive ratios is enabled through the related set, a stepwise rotatable member associated with each set and adapted at each step of rotation to shift the related controlling means from the present one to the other one of its positions, a common driver member for said sets and means for continually rotating said driver member, each stepwise rotatable member being shiftable between a position in which it is in drivably coupled relation with said common driver member and a position in which it is uncoupled therefrom, a cyclically operative means associated with each set and operative when enabled to produce first a shift of the associated first member into its coupled relation with said common driver to have a step of rotation imparted to said associated first member, and operative after a predetermined period to produce a shift of said associated first member back to its uncoupled position, whereby said associated controlling means is shifted from the present one to the other one of its said positions, and selective operating means movable to any one of a plurality of positions for enabling at least one selected one of said cyclic means.

12. A power transmission as claimed in claim 11, wherein there are two planetary gear sets and providing a four-speed gearbox.

13. In a power transmission as claimed in claim 11, a synchronizer pinion associated with each gear set and rotatable with respect to said shafts, a gear drive from each of said stepwise rotatable member to the associated synchronizer pinion, dog clutch means on opposite sides of each controlling means and respectively cooperating dog clutch means on each synchronizer pinion and on an element of each associated gear-set.

14. In a power transmission as claimed in claim 3, means biasing said follower into engagement with said cam, selector means normally holding said follower out of engagement with said cam, and actuating means operable on said selector means for releasing said follower.

15. In a power transmission as claimed in claim 3, an axially movable part connected with said follower and reciprocable between a position in which said follower is held out of engagement with the cam and a position in which the follower is engaged with the cam, means biassing said part towards said second position, a pawl pivoted relative to said part about an axis normal to the axis of movement of said part and rockable between a locking position in which said part is retained in its first position and a releasing position, detent means associated with said pawl and normally adapted to lock said pawl in its said locking position, and actuating means operable to release said detent to allow the pawl to pivot to said releasing position to allow said part to be moved to its said second position in which the follower is in engagement with said cam.

16. In a power transmission as claimed in claim 3, an axially movable and rotatable part connected with said follower and axially reciprocable between a position in which said follower is held out of engagement with the cam and a position in which the follower is engaged with the cam, means biassing said part towards said second position, a pawl pivoted to said part about an axis normal to the axis of reciprocation thereof and rockable between a locking position in which said part is retained in its first position, and a releasing position detent means associated with said pawl and normally adapted to lock said pawl in its said locking position, means connecting said part with said stepwise rotatable member for rotation therewith, whereby said pawl and said detent means are alternatively placed in each of one of two angular positions at each step of rotation of said member, and operating means selectively placeable in either one of two corresponding angular positions for causing said detent to become released as it is rotated to a selected one of its two positions.

17. In combination with a power transmission as claimed in claim 3, a combustion engine, throttle means associated with said engine, a main clutch having a drive element driven by said engine and a driven element driving said drive shaft of the transmission, a first operative connection from said follower to said throttle and a second operative connection from said follower to said main clutch, whereby said clutch is moved to uncoupling condition and said throttle is moved towards its closed condition as said follower is moved into engagement with said cam.

18. In combination with a power transmission as claimed in claim 3, a governor, responsive to variations in the speed of rotation of the driven shaft, coacting with the latter and with said operating means of the follower to move the follower into engagement with said cam and thereby initiate a change in drive ratios in said gearing.

19. In combination with a power transmission as claimed in claim 18, manually operable means for varying the responsiveness of said governor with respect to the speed of rotation of the driven shaft, whereby to permit control of the speed conditions under which automatic changing of said drive ratios may occur.

20. In combination with a power transmission as claimed in claim 3, said operating means for moving said follower into engagement with the cam being responsive to the speed of rotation of the driven shaft.

References Cited in the file of this patent

UNITED STATES PATENTS 2,593,416    Dawson  ---------------- Apr. 22, 1952